United States Patent
Parker et al.

(10) Patent No.: US 6,182,697 B1
(45) Date of Patent: Feb. 6, 2001

(54) ROTARY DIRECTIONAL VALVE WITH INTEGRAL LOAD HOLDING CHECK

(75) Inventors: Scott M. Parker, Victoria; Gregory F. Lantsberg, Chaska; Peter R. Nelson, Bloomington, all of MN (US)

(73) Assignee: Eaton Corporation, Cleveland, OH (US)

( * ) Notice: Under 35 U.S.C. 154(b), the term of this patent shall be extended for 0 days.

(21) Appl. No.: 09/349,337

(22) Filed: Jul. 8, 1999

(51) Int. Cl.⁷ ..................................................... F16K 11/02
(52) U.S. Cl. ................... 137/625.16; 137/625.23; 91/468
(58) Field of Search ................... 137/625.15, 625.16, 137/65.23, 625.28, 625.22, 625.67; 91/437, 468

(56) References Cited

U.S. PATENT DOCUMENTS

| | | | |
|---|---|---|---|
| 2,881,802 | * 4/1959 | Crawford | 137/625.23 |
| 2,940,476 | * 6/1960 | Schultz | 137/625.23 |
| 3,015,344 | * 1/1962 | Hausmann et al. | 137/625.23 |
| 3,774,634 | * 11/1973 | Bonney | 137/625.23 X |
| 3,972,246 | * 8/1976 | Link | 91/37 X |
| 4,738,279 | * 4/1988 | Kropp | 91/446 X |
| 5,131,431 | * 7/1992 | Vullmahn | 137/625.23 |
| 5,339,917 | * 8/1994 | Eberhart | 137/625.23 |
| 5,465,755 | * 11/1995 | Lapp | 137/625.23 |
| 5,992,454 | * 11/1999 | Schrag | 91/447 X |
| 6,098,647 | * 8/2000 | Haussler et al. | 91/468 X |

FOREIGN PATENT DOCUMENTS

2201277 * 1/1972 (DE) ................. 137/625.15

* cited by examiner

*Primary Examiner*—John Rivell
*Assistant Examiner*—Meredith H. Schoenfield
(74) *Attorney, Agent, or Firm*—L. J. Kasper (57) ABSTRACT

A cartridge valve assembly (19) including a sleeve valve (49) fixed within a valve housing (17), and a spool valve (47) moveable both axially and rotatably within the sleeve valve. Rotation of an input (35,39) causes rotation of a cam member (43) and the spool valve, and the engagement of the cam member (43) with a cam surface (57) results in axial movement of the spool valve within the sleeve valve. The spool and sleeve valves define a neutral axial and rotational position (FIG. 5), and rotation from neutral in a first direction (FIG. 6) communicates fluid from an inlet port (21) to a first actuator port (25), and rotation from neutral in a second direction (FIG. 7) communicates fluid from the inlet port to a second actuator port (27). In either case, the axial movement of the spool valve (47), relative to the sleeve valve (49) is the same. The spool valve defines a load holding land (97) which, in the neutral position (FIG. 5) engages a seat (99) defined by the interior of the sleeve valve (49), to block the flow of fluid from the first actuator port (25), and provide an integral load holding capability, with no extra valving or plumbing.

5 Claims, 8 Drawing Sheets

RAISE

ROTARY DIRECTIONAL VALVE WITH INTEGRAL LOAD HOLDING CHECK

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE DISCLOSURE

The present invention relates to cartridge valve assemblies, and more particularly, to such cartridge valve assemblies for use in raising and lowering accessories in vehicle hydraulic systems.

On many vehicles, such as lawn and garden tractors, there is a hydraulic system which may include one or more priority functions, such as a power steering system, and one or more ancillary (or auxiliary) hydraulic functions, such as driving a rotary actuator to wind up a winch, or raising and lowering a cylinder to control some portion of the vehicle. For example, on turf equipment, it is common to have a hydraulic cylinder associated with the mower deck, and operable to raise and lower the mower deck, in response to movement of a main control valve.

In most vehicle hydraulic systems of the type described above, conventional spool type direction and flow control valves have been used to control flow to and from such hydraulic accessories. Unfortunately, a typical spool valve assembly adds substantially to the overall cost of the vehicle hydraulic system. This is especially true in the case wherein the auxiliary hydraulic function is a cylinder or some other actuator which requires "load holding" capability. An example would be a lift cylinder for a mower deck, wherein the control valve assembly must be capable of maintaining the lift cylinder at a desired position so that the weight of the mower deck does not cause fluid leakage, thus permitting the mower deck to move downward from its desired position.

In the case of hydraulic functions which require load holding capability, it is typical to provide the control valve assembly with pilot operated check valves. Such check valves are normally effective to provide the load holding capability, but add substantially to the overall cost and complexity, and even the physical size, of the total control valve assembly. This is especially true if the vehicle manufacturer purchases pilot operated check valves which are separate from the main control spool, and must be separately plumbed into the system.

BRIEF SUMMARY OF THE INVENTION

Accordingly, it is an object of the present invention to provide an improved control valve assembly, especially for use in vehicle hydraulic systems, which overcomes the disadvantages of the prior art.

It is a more specific object of the present invention to provide such a control valve assembly in the form of a cartridge valve assembly, which is able to provide the necessary flow control functions in response to a somewhat conventional manual input.

It is another object of the present invention to provide such an improved cartridge valve assembly which has, integral therewith, load holding capability, but without the need for a separate check valve arrangement.

The above and other objects of the invention are accomplished by the provision of a cartridge valve assembly adapted to be disposed in a valve housing defining a cartridge bore, an inlet port, a tank port, and first and second actuator ports. The cartridge valve assembly includes a sleeve valve fixed within the cartridge bore and a spool valve disposed within the sleeve valve for movement therein.

The improved cartridge valve assembly is characterized by the spool valve being moveable both axially and rotatably within the sleeve valve. The assembly includes means biasing the spool valve toward a neutral axial and rotational position within the sleeve valve, in which the inlet port is blocked from fluid communication with the first actuator port. There is means operable to displace the spool valve in a first rotational direction, away from the neutral rotational position, in response to an input in the first direction, and in a second rotational direction, away from the neutral rotational position, in response to an input in the second direction. The means operable to displace the spool valve includes cam means whereby rotation of the spool valve in the first direction results in axial movement of the spool valve from the neutral axial position toward an axial operating position, and rotation of the spool valve in the second direction results in axial movement of the spool valve from the neutral axial position toward the axial operating position. The spool valve and the sleeve valve, when the spool valve is displaced in the first rotational direction, and is in the axial operating position, provide fluid communication from the inlet port to the first actuator port and from the second actuator port to the tank port. The spool valve and the sleeve valve, when the spool valve is displaced in the second rotational direction, and is in the axial operating position, provide fluid communication from the inlet port to the second actuator port, and from the first actuator port to the tank port.

In accordance with another aspect of the invention, the improved cartridge valve assembly is characterized by the spool valve defining a load holding land in sealing engagement with a seat surface disposed within the valve sleeve. When the spool valve is in the neutral axial and rotational position, the engagement of the load holding land and the seat surface block fluid communication from the first actuator port to any of the inlet port, the tank port and the second actuator port.

DETAILED DESCRIPTION OF THE PREFERRED EMBODIMENT

Figure 1:
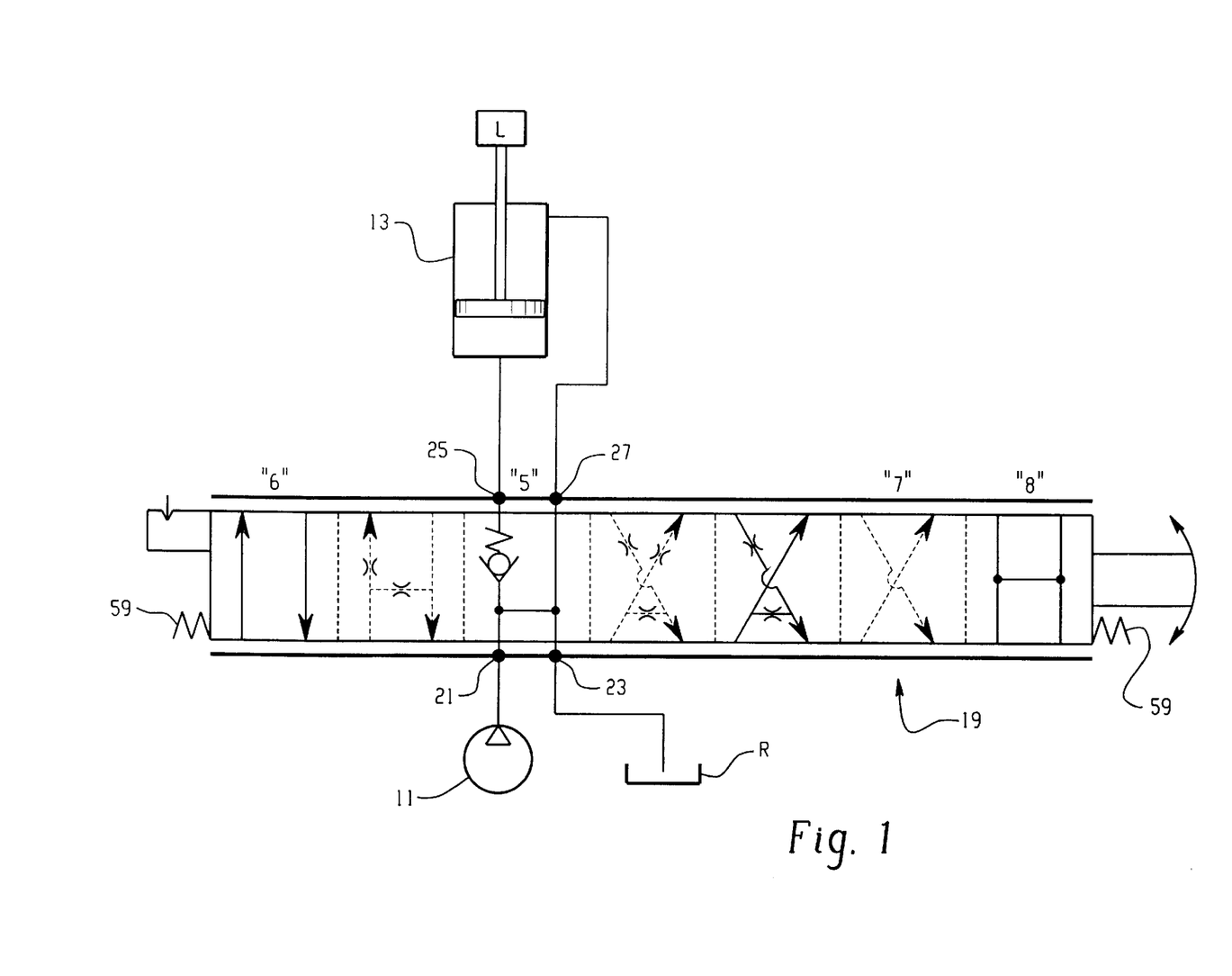
FIG. 1 is a somewhat simplified hydraulic schematic of the portion of the overall vehicle hydraulic system to which the present invention relates, including the cartridge valve assembly of the present invention.
Figure 2:
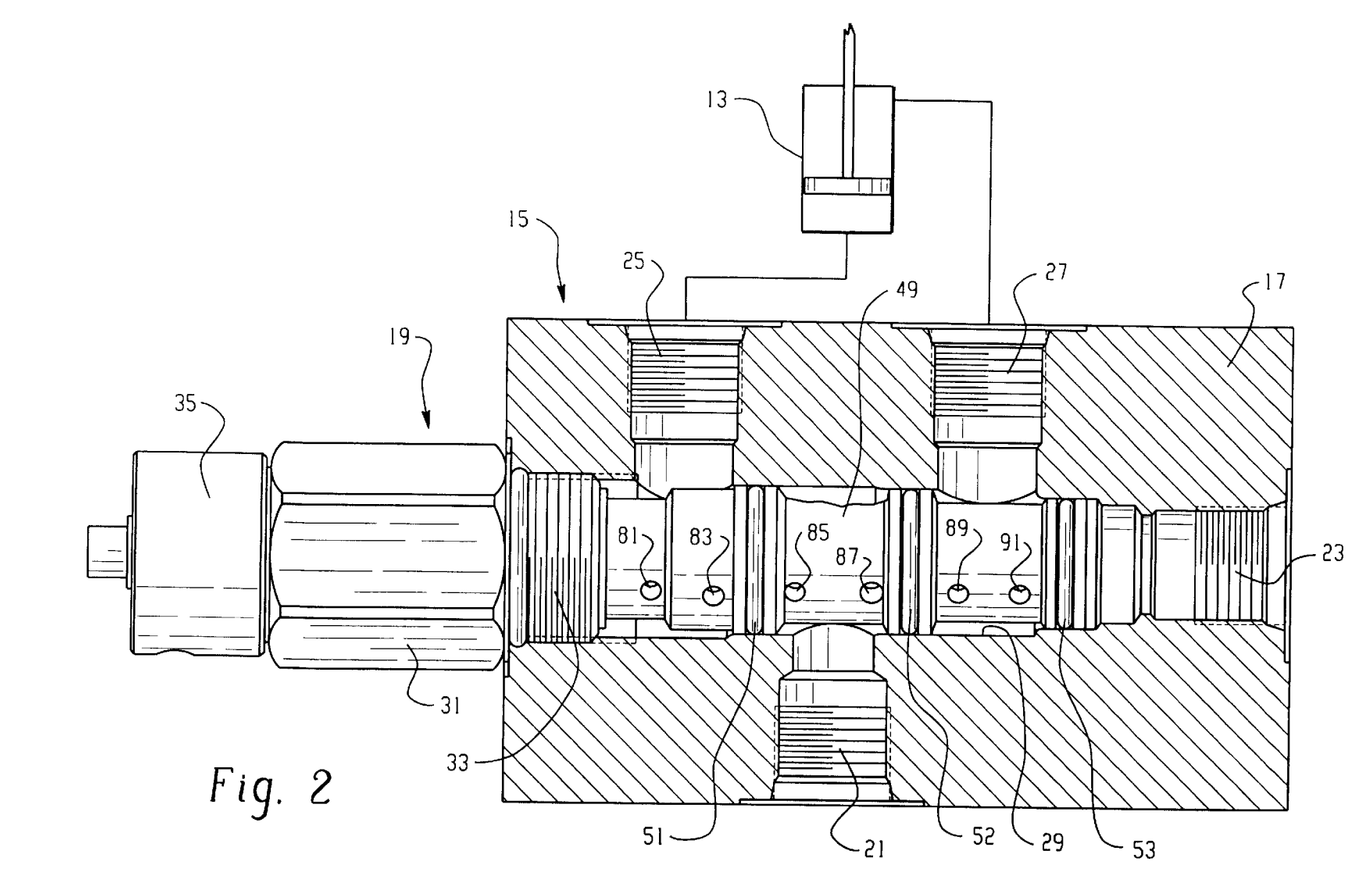
FIG. 2 is an axial cross-section of a valve housing, and disposed therein, the cartridge valve assembly of the present invention, in external plan view.

Referring now to the drawings, which are not intended to limit the invention, FIGS. 1 and 2 illustrate a vehicle hydraulic system for controlling fluid flow from a source, such as a pump 11 to a vehicle auxiliary device, shown herein as a hydraulic cylinder 13. As is shown schematically in FIG. 1, the cylinder 13 is used to raise and lower a load L which, by way of example only, may comprise a mower deck on a lawn tractor.

The control of fluid flow from the pump 11 to the cylinder 13 is accomplished by means of a control valve assembly, generally designated 15 (see FIG. 2) which includes a valve housing 17 and a cartridge valve assembly, generally designated 19. The valve housing 17 defines an inlet port 21, for connection to the pump 11, and a return port 23, for connection to a low pressure fluid source, such as a system reservoir R. The valve housing 17 also defines a pair of actuator ports 25 and 27, for connection to the opposite ends of the cylinder 13 in a manner generally well known to those skilled in the art.

The valve housing 17, which may be formed integrally with the housing of some other vehicle hydraulic component, defines a multi-step bore 29, and disposed within the bore 29 is the valving portion of the cartridge valve assembly 19, as will be described in (greater detail subsequently.

Figure 3:
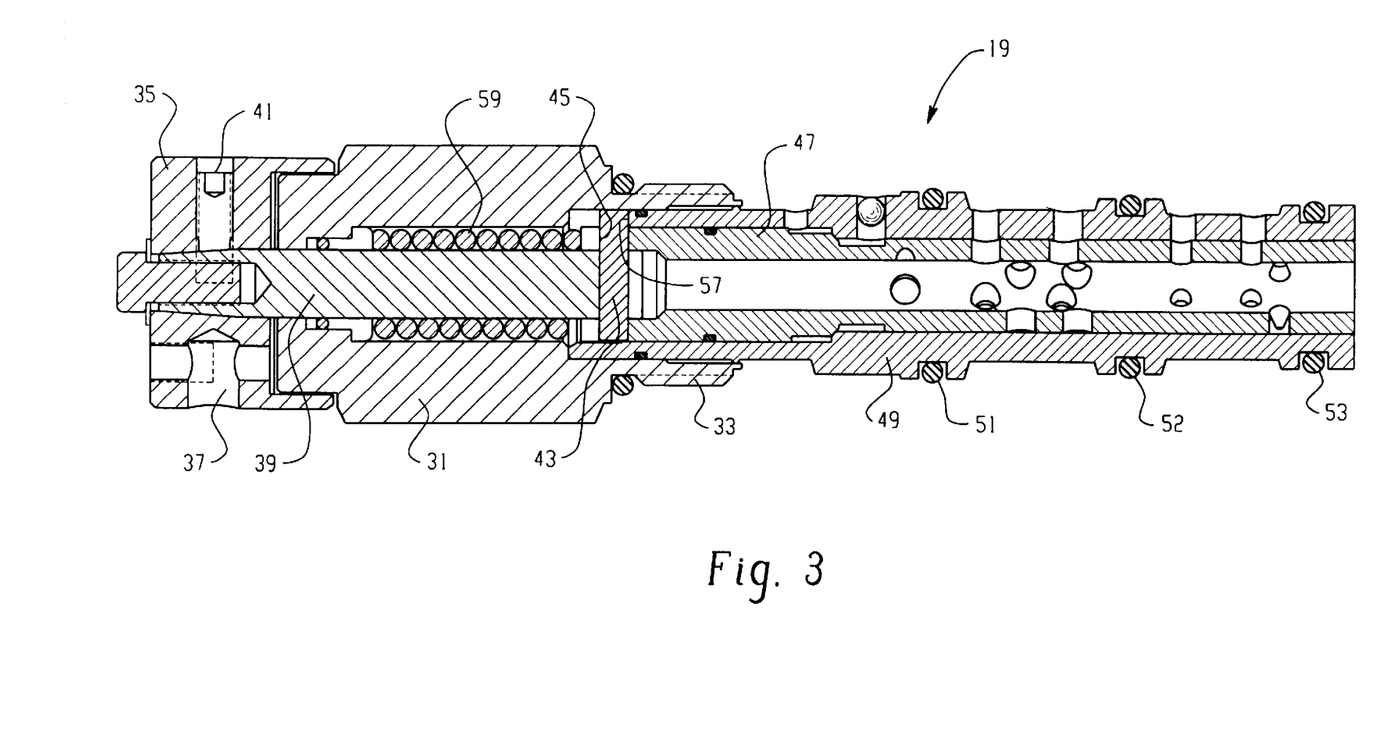
FIG. 3 is an axial cross-section of the cartridge valve assembly shown in external plan view if FIG. 2, and on about the same scale.

Referring now primarily to FIGS. 2 and 3, the cartridge valve assembly 19 includes a main body 31, having an externally threaded portion 33 which is in threaded engagement with the left end of the bore 29 in FIG. 2, thus retaining the assembly 19 in a fixed position relative to the valve housing 17. Partially surrounding the left end of the main body 31 is a generally cylindrical knob 35 which, in the subject embodiment, comprises the manual input to the cartridge valve assembly 19. Preferably, such manual input may be facilitated by providing an elongated lever (not shown herein), extending radially out of a bore 37 defined by the knob 35. An input shaft 39 extends axially through the knob 35 and through a central opening in the main body 31, and is preferably fixed to rotate with the knob 35, such as by means of a taper on the left end of the shaft 39, and also by means of a set screw 41. The right end (in FIG. 3) of the input shaft 39 extends into the valving portion of the cartridge valve assembly 19, and has a dowel pin 43 extending diametrically therethrough, and also extending through diametrically opposed circular openings 45 defined by a spool valve 47. The spool valve 47 is moveable both axially and rotationally within a sleeve valve 49, the sleeve valve 49 being fixed relative to the main body 31, and therefore, being stationary within the bore 29.

Figure 4:
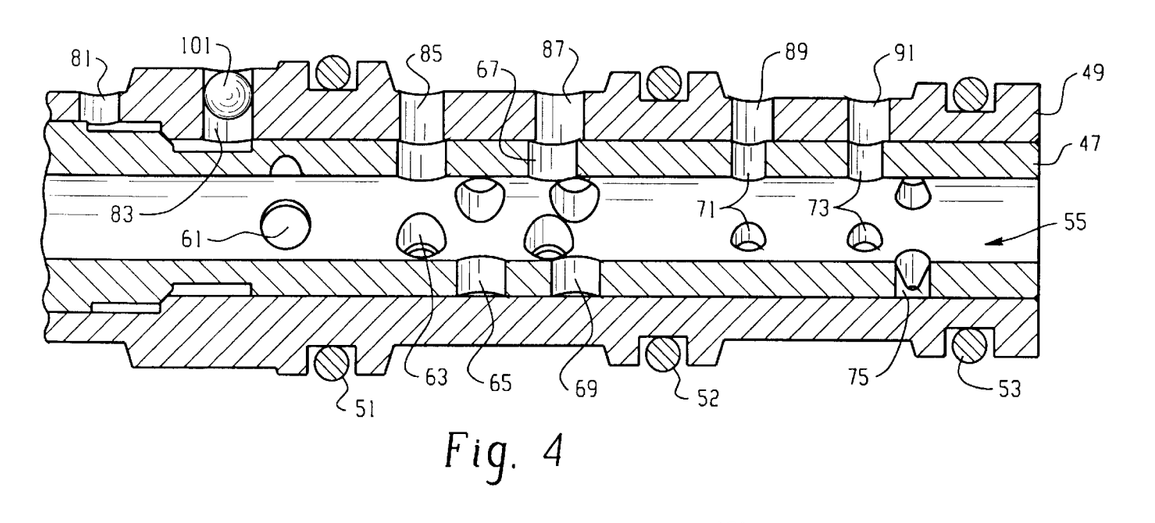
FIG. 4 is an enlarged, fragmentary, axial cross-section similar to FIG. 3.

Referring now to FIGS. 2, 3 and 4 together, it may be seen that the sleeve valve 49 is provided with three O-ring seals 51, 52 and 53 which sealingly engage the bore 29 to isolate the various fluid ports from each other. It should be noted by comparing FIGS. 3 and 4 with FIG. 2 that the interior of the spool valve 47, generally designated 55 in FIG. 4, is in open fluid communication with the return port 23.

Figure 5:
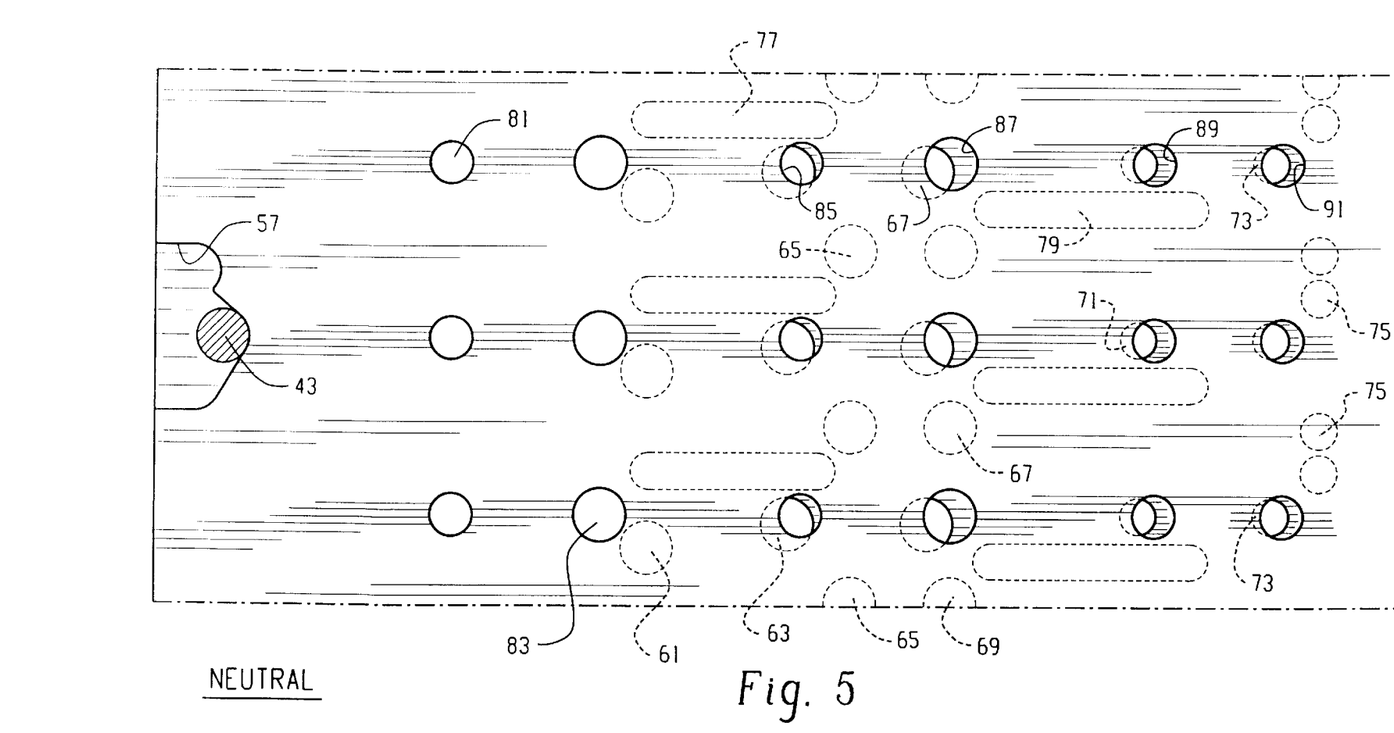
FIG. 5 is a layout view of the spool and sleeve valving, illustrating the neutral axial and rotational position.

Referring again primarily to FIG. 3, in conjunction with FIG. 5, it may be seen that the left end of the sleeve valve 49 defines a cam surface 57, which typically would be provided at only one location on the sleeve valve 49.

Disposed radially between the input shaft 39 and the main body 31 is a cylindrical compression spring 59 (also shown schematically in FIG. 1). The function of the spring 59 is to bias the spool valve 47 to the right in FIG. 3 (or in the schematic of FIG. 1, to the neutral position), thus biasing the dowel pin 43 into engagement with the cam surface 57. It should be noted that in the schematic of FIG. 1, above certain sections (positions) of the schematic are the reference numerals "5", "6", "7" and "8", those sections of the schematic corresponding to the valve layout views shown in FIGS. 5 through 8, respectively. As will be understood by those skilled in the art, the other schematic positions in FIG. 1 are merely intermediate positions, intended to show all of the various communication paths as the valving progressively moves from one position to another.

Referring now primarily to FIGS. 4 and 5, the spool valve 47 and sleeve valve 49 will be described in greater detail. It should be noted that what is shown in the layout views of FIGS. 5 through 8 is the actual valving interface, i.e., the ports and slots on the outer surface of the spool valve 47 (in dashed lines), and the ports at the inner surface of the sleeve valve 49 (in solid lines).

The spool valve 47 defines three ports 61; three ports 63; three ports 65; three ports 67; three ports 69; three ports 71; three ports 73; and six ports 75. All of the ports 61 through 75 defined by the spool valve 47 extend through the entire radial extent of the spool valve 47, i.e., they interconnect the valving interface with the interior 55, and therefore, all of the ports 61 through 75 are in communication with the return port 23.

Referring now primarily to FIG. 5, but not FIG. 4, the spool valve 47 also defines three axial slots 77 and three axial slots 79. The slots 77 and 79 are formed only on the outer surface of the spool valve 47, and therefore are not in communication with the interior 55, and are not in communication with the return port 23. As will become apparent subsequently, the function of the slots 77 and 79 is to permit communication between different groups of ports defined by the sleeve valve 49.

Referring again to FIGS. 4 and 5, in conjunction with FIG. 2, the sleeve valve 49 defines three ports 81 and three ports 83, the ports 81 being in open communication with the actuator port 25, and the ports 83 being indirectly in communication with the actuator port 25, past a seat 99 (to be described subsequently) and through the ports 81. The sleeve valve 49 defines three ports 85 and three ports 87, the ports 85 and 87 being in open communication with the inlet port 21. Finally, the sleeve valve 49 defines three ports 89 and three ports 91, the ports 89 and 91 being in open communication with the actuator port 27. Those skilled in the art will understand that the specific number of each of the ports and slots recited above is by way of example only, and is not essential to the present invention.

Referring now primarily to FIG. 5, when the manual input to the knob 35 is released, and the spring 59 returns the valving to its neutral position (position "5" in FIG. 1), the relationship of the spool valve 47 and sleeve valve 49 is as illustrated in FIG. 5. With the valving in neutral, pressurized fluid entering the inlet port 21 flows through the ports 85 and 87, which, in the neutral position, are overlapping the spool valve ports 63 and 67, respectively. Therefore, inlet fluid flows through the ports 63 and 67 to the interior 55 of the spool valve 47, and then to the return port 23. Also when the valving is in neutral, the ports 89 and 91 in the sleeve valve overlap the ports 71 and 73 in the spool valve, such that the upper chamber (rod end) of the cylinder 13 is in communication through the actuator port 27, and through the ports 89 and 91 and 71 and 73, with the return port 23. It should be noted in FIG. 5 that, in neutral, the dowel pin 43 engages the "lowest" portion of the cam surface 57, i.e., the spool valve 47 is in its rightward-most position relative to the sleeve valve 49. The significance of this will become apparent subsequently.

Figure 6:
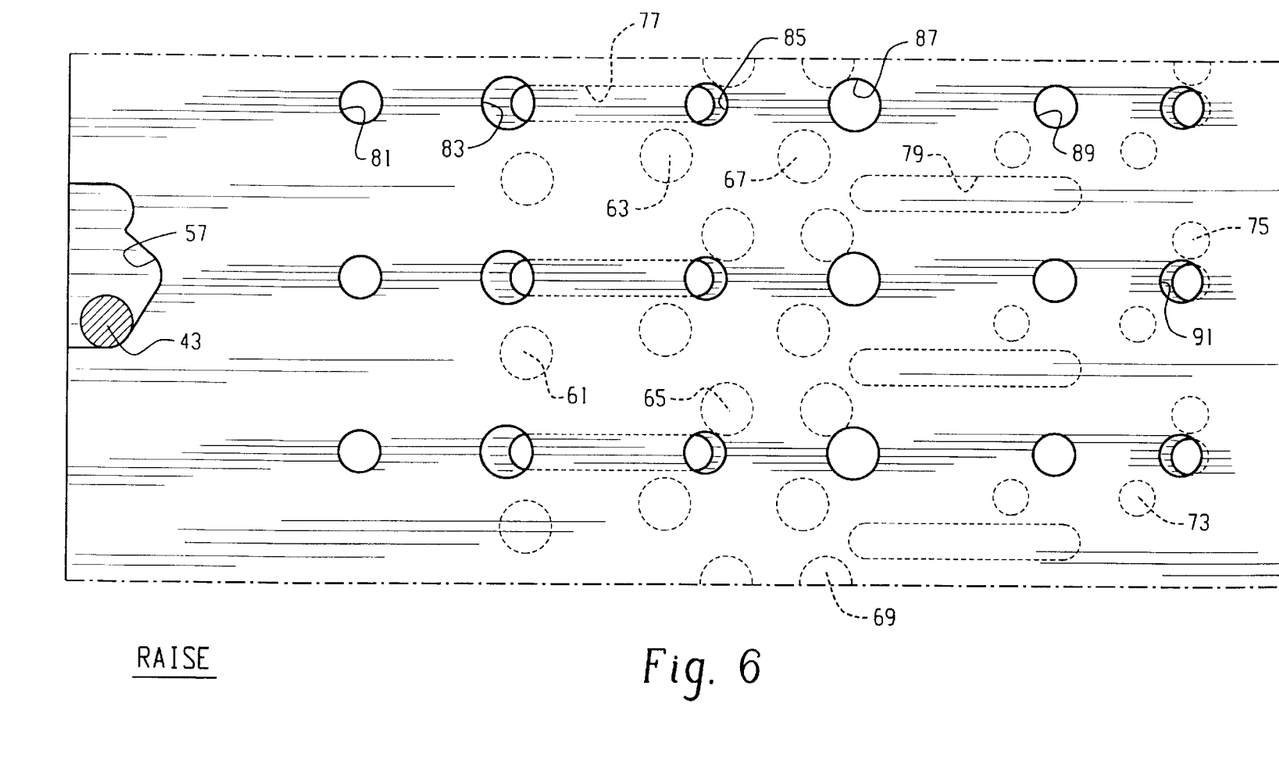
FIGS. 6, 7 and 8 are layout views, similar to FIG. 5, illustrating three different operating positions of the spool and sleeve valving of the cartridge valve assembly.

Referring now primarily to FIG. 6, when the vehicle operator wishes to raise the load, the lever and the knob 35 may be rotated in a clockwise direction as viewed from the left end in any one of FIGS. 2 through 8. The result is that the dowel pin 43 rides up one portion of the cam surface 57, moving the spool valve 47 to the left, relative to the sleeve valve 49, and "downward" from the position shown in FIG. 5 to that shown in FIG. 6. With the valving in the Raise position (position "6" in FIG. 1), the ports 85 and 87 in the sleeve valve 49 receive pressurized fluid from the inlet port 21, but the ports 85 and 87 are no longer in communication with the ports 63 and 67 in the spool valve. Instead, the port 85 is now in communication with the adjacent axial slot 77, the other end of the axial slot 77 being in communication with one of the ports 83. As may best be seen in FIGS. 4 and 6A, each of the ports 83 is plugged with a ball 101, such that fluid in the axial slots 77 enters the ports 83, but then flows to the ports 81 in a manner to be described subsequently. Thus, pressurized fluid flows from the inlet port 21 through the sleeve ports 85, through the axial slots 77 and out the sleeve ports 81 to the actuator port 25, and then to the lower chamber (head end) of the cylinder 13. At the same time, fluid being expelled from the rod end of the cylinder 13 is communicated back through the actuator port 27 and through the sleeve ports 91, which are now overlapping adjacent ports 75 in the spool valve 47. Thus, fluid expelled from the rod end of the cylinder 13 is communicated to the return port 23.

In accordance with one important aspect of the present invention, the relative position of the spool and sleeve as shown in FIGS. 3, 4 and 5 comprises the neutral position, axially, wherein, as mentioned previously, the spool valve 47 is in its rightward-most position, relative to the sleeve valve 49. Referring again primarily to FIG. 5, in order to raise the cylinder 13, the knob 35 and dowel pin 43 are moved clockwise, as was described above in connection with FIG. 6, and such clockwise rotation of the pin 43 and spool valve 47 results in axial movement of the spool valve 47 to the left from the position shown in FIG. 5. In order to lower the cylinder 13, i.e., by directing pressurized fluid from the inlet port 21 to the actuator port 27, the spool valve 47 and pin 43 are rotated counterclockwise (as viewed from the left in any one of FIGS. 2 through 8). However, in accordance with an important aspect of the invention, such movement of the spool valve 47 in the "opposite" direction, to thereby move the cylinder 13 in the opposite direction, still involves axial movement by the spool valve 47 toward the left, from the neutral axial position shown in FIG. 5. A particular advantage of this feature will now be described.

Figure 6A:
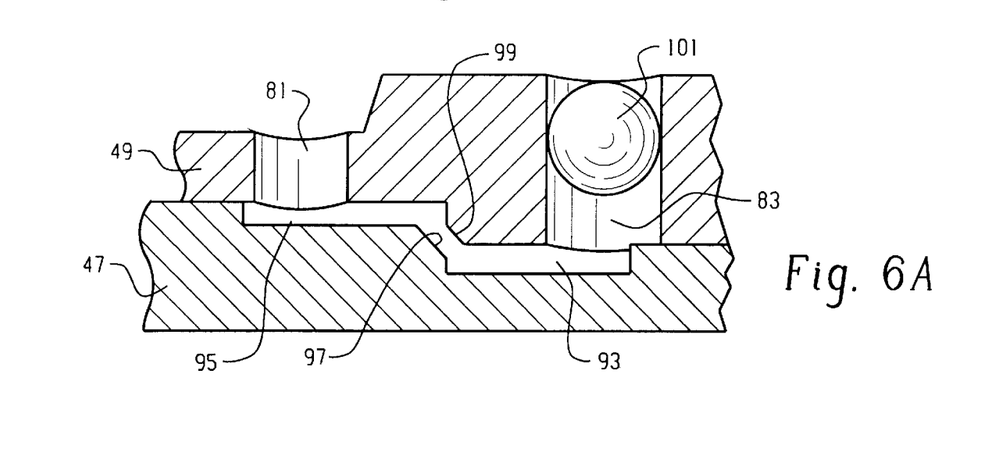
FIG. 6A is an enlarged, fragmentary, axial cross-section similar to FIG. 4, but with the spool and sleeve valving in a position corresponding to that of FIG. 6.

Referring now primarily to FIG. 6A, in conjunction with FIG. 6, it may be seen that the spool valve 47 defines an annular groove 93, generally aligned with the ports 83, and an annular groove 95, generally aligned with the ports 81. The annular grooves 93 and 95 intersect to form an annular land surface 97, and disposed adjacent thereto, the sleeve valve 49 defines an internal, annular seat surface 99. Thus, with each of the ports 83 being plugged by the ball plug 101 as shown in FIG. 4, pressurized inlet fluid in the axial slots 77 flows into each of the ports 83, and from there into the annular groove 93, then between the surfaces 97 and 99 and into the annular groove 95, then out through the ports 81 to the actuator port 25.

After the spool valve 47 has been in the raised position shown in FIG. 6, when the handle is released and the spool valve 47 returns to the neutral position of FIG. 5, the spool valve 47 returns to its neutral axial position of FIGS. 3 and 4, and the land surface 97 engages the seat surface 99, under the biasing force of the spring 59. As is well known to those skilled in the art, a typical load on the cylinder 13 would generate sufficient pressure in the conduit and the actuator port 25 that, if the piece of equipment were left for a period of time with the cylinder in the raised position, the pressurized fluid in the port 25 would begin to leak back through the ports 81, and then through the radial clearance between the spool valve 47 and sleeve valve 49, then leak through the ports 61 to the interior 55 and back to the return port 23. Such leakage with the cylinder under load would result in a gradual lowering of the cylinder over a period of time which is considered extremely undesirable from the standpoint of the customer and the vehicle operator.

Therefore, in accordance with another aspect of the invention, the land surface 97 and seat surface 99 have been provided as a load holding check valve. Thus, when the spool valve 47 returns to the neutral position of FIG. 5, the force of the biasing spring 59 biases the land surface 97 into tight sealing engagement with the seat surface 99. Thereafter, regardless of the load on the cylinder 13, pressurized fluid in the actuator port 25 and in the ports 81 can enter the annular groove 95, but is prevented by the load holding check surfaces 97 and 99 from flowing into the annular groove 93 and therefore, is prevented from leaking down in the manner previously described. The way in which the load holding capability is provided illustrates the importance of having the spool valve 47 move axially in the same direction (to the left) whether the inlet port 21 is to be communicated with the actuator port 25, or is to be communicated with the actuator port 27.

Figure 7:
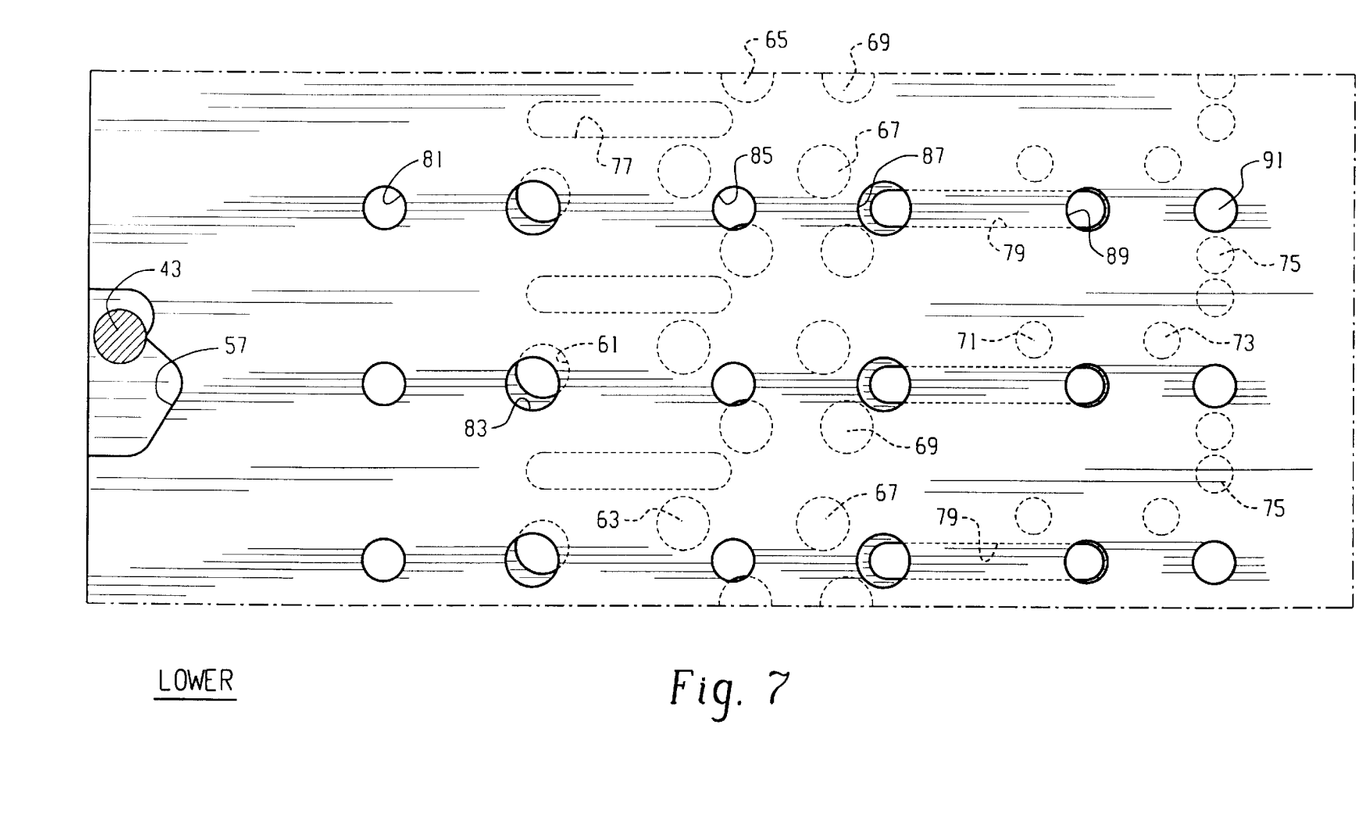

Referring now primarily to FIG. 7, when the operator wishes to power the cylinder 13 in a downward direction, the dowel pin 43 and the spool valve 47 may be rotated counterclockwise from the position shown in FIG. 5 to that shown in FIG. 7 (position "7" in FIG. 1). With the valving in the Lower position shown in FIG. 7, pressurized fluid entering the inlet port 21 flows through the sleeve ports 85 and 87, but the ports 85 are now blocked from communication with any of the ports or passages in the spool valve 47. However, each of the ports 87 is now in communication with the left end of the adjacent axial slot 79, the right end of the slot 79 being in communication with one of the sleeve ports 89, such that pressurized fluid flows out through the ports 89 to the actuator port 27, and then to the rod end of the cylinder 13. As the piston within the cylinder 13 moves downward, return fluid exhausted from the head end of the cylinder flows back through the actuator port 25, through the ports 81, then through the annular grooves 95 and 93 (see FIG. 6A). The return fluid in the groove 93 then enters the ports 83 which, in the position shown in FIG. 7, now overlap the spool ports 61 such that the return fluid flows through the ports 61 to the interior 55, and then to the return port 23. It should be understood that the Lower position represented in FIG. 7 is not merely one discrete position of the spool valve 47 and sleeve valve 49, but instead, as is shown schematically in FIG. 1, the Lower position is a range of relative positions of the spool valve and sleeve valve.

Figure 8:
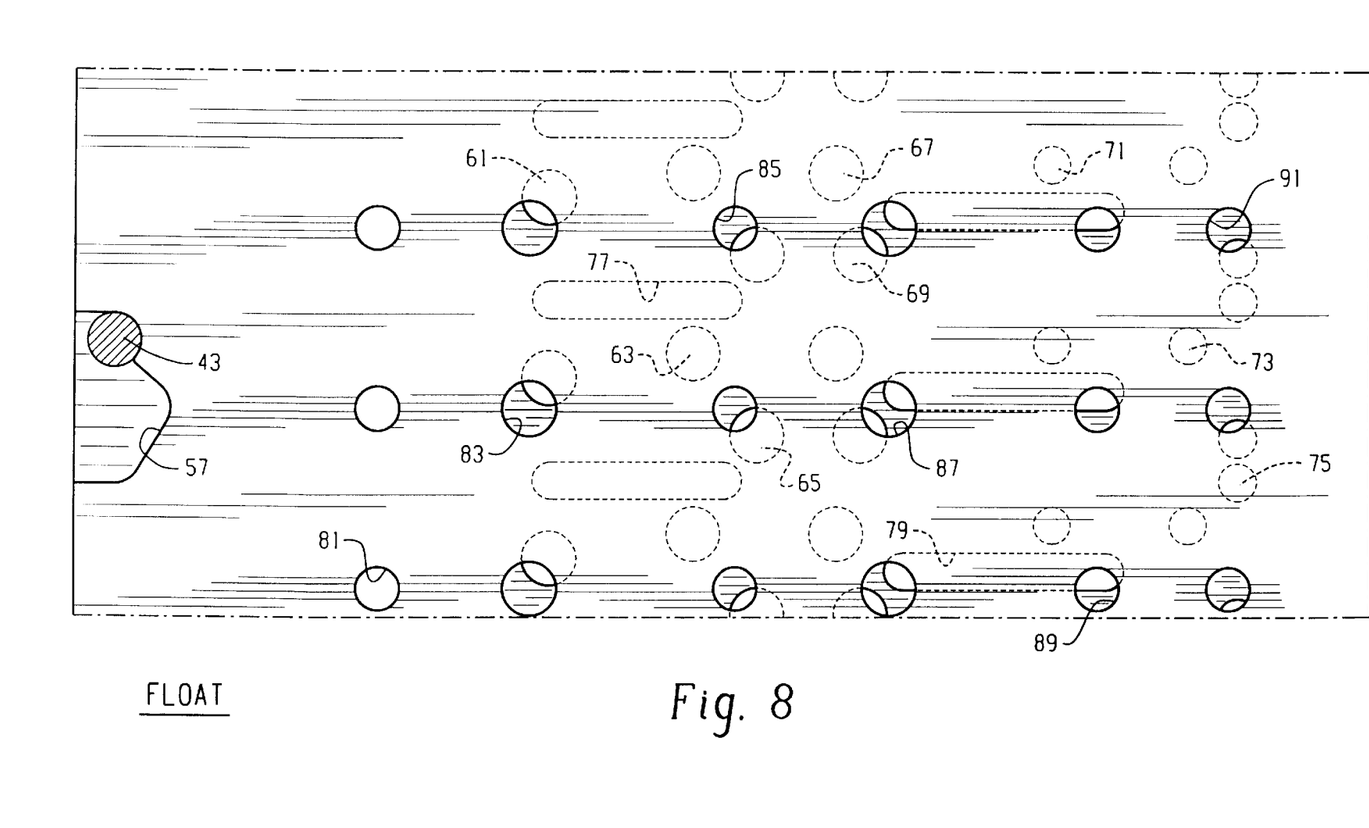

Referring now primarily to FIG. 8, when the operator wishes to permit the vehicle accessory to "Float", as that term is well understood in the hydraulic control art, whereby the cylinder 13 is free to move upward and downward in response to imposed loads, the operator rotates the dowel pin 43 and spool valve 47 counterclockwise, to the position shown in FIG.8 (position "8" in FIG. 1). With the valving in the Float position of FIG. 8, pressurized fluid entering the inlet port 21 flows through the sleeve ports 85 and 87, which are partially overlapping the spool ports 65 and 67, respectively, such that the inlet port 21 is in communication with the interior 55 and the return port 23. At the same time, fluid in the actuator port 25 is in communication through the ports 81 with the ports 83, in the manner described preciously, and the ports 83 are overlapping the spool ports 61, and thus, are in communication with the interior 55 and the return port 23. Finally, fluid in the actuator port 27 flows through the sleeve ports 89 and 91, which are in communication with the axial slots 79 and the spool ports 75, respectively. The fluid in the axial slots 79 flows through the sleeve ports 87 and into the spool ports 69, as described previously, while the fluid in the spool ports 75 merely flows to the interior 55 and to the return port 23. Thus, with all of the ports 21, 23, 25 and 27 interconnected, the cylinder 13 is free to move upward and downward under the influence of external forces.

From the foregoing description, it may be seen that the present invention provides a cartridge valve assembly which may be used to control the flow of fluid, in response to a generally conventional manual input, in the manner of a three-position, four-way flow control, wherein the valve assembly includes integral load holding capability, without the need for added structure and plumbing.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A cartridge valve assembly adapted to be disposed in a valve housing defining a cartridge bore, an inlet port, a tank port, and first and second actuator ports; said cartridge valve assembly including a sleeve valve fixed within said cartridge bore, and a spool valve disposed within said sleeve valve for movement therein; characterized by:

(a) said spool valve being moveable both axially and rotatably within said sleeve valve;
   (b) means biasing said spool valve toward a neutral axial and rotational position within said sleeve valve in which said inlet port is blocked from fluid communication with said first actuator port;
   (c) means operable to displace said spool valve in a first rotational direction, away from said neutral rotational position, in response to an input in said first direction, and in a second rotational direction, away from said neutral rotational position, in response to an input in said second direction;
   (d) said means operable to displace said spool valve including cam means whereby rotation of said spool valve in said first direction results in axial movement of said spool valve from said neutral axial position toward an axial operating position, and rotation of said spool valve in said second direction results in axial movement of said spool valve from said neutral axial position toward said axial operating position;
   (e) said spool valve and sleeve valve, when said spool valve is displaced in said first rotational direction, and is in said axial operating position, providing fluid communication from said inlet port to said first actuator port and from said second actuator port to said return; and
   (f) said spool valve and said sleeve valve, when said spool valve is displaced in said second rotational direction, and is in said axial operating position providing fluid communication from said inlet port to said second actuator port and from said first actuator port to said return port.

2. A cartridge valve assembly as claimed in claim 1, characterized by said spool valve defining a load holding land in sealing engagement with a seat surface defined by said valve sleeve when said spool valve is in said neutral axial and rotational position, said engagement of said load holding land and said seat surface blocking fluid communication from said first actuator port to any of said inlet port, said return port and said second actuator port.

3. A cartridge valve assembly as claimed in claim 2, characterized by said spool valve defining a first sleeve port in fluid communication with said first actuator port, and a second sleeve port in fluid communication with said inlet port, said first sleeve port being disposed toward one axial end of said spool valve, said load holding land being disposed axially between said first sleeve port and said second sleeve port.

4. A cartridge valve assembly as claimed in claim 1, characterized by said spool valve, in said neutral axial and rotational position, permitting fluid communication from said inlet port to said return port.

5. A cartridge valve assembly as claimed in claim 1, characterized by said sleeve valve defining a cam surface and said spool valve including a cam member fixed relative to said spool valve, and in operable engagement with said cam surface, said cam means comprising said cam surface and said cam member, whereby movement of an input member moves said spool valve and said cam member in a rotational direction, and the engagement of said cam member and said cam surface) results in axial movement of said spool valve, relative to said sleeve valve.

* * * * *